United States Patent
Narayanan et al.

(10) Patent No.: US 9,357,017 B2
(45) Date of Patent: May 31, 2016

(54) METHOD AND APPARATUS FOR AUTOMATIC SERVICE DISCOVERY AND CONNECTIVITY

(75) Inventors: Vidya Narayanan, San Diego, CA (US); Saumitra Mohan Das, San Jose, CA (US); Ashwin Swaminathan, San Diego, CA (US); Sanjiv Nanda, Ramona, CA (US); Ranjith Subramanian Jayaram, Short Hills, NJ (US); Lakshminath Reddy Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 13/358,309

(22) Filed: Jan. 25, 2012

(65) Prior Publication Data

US 2013/0191518 A1    Jul. 25, 2013

(51) Int. Cl.

| H04L 12/28 | (2006.01) |
|---|---|
| H04L 29/08 | (2006.01) |
| H04W 84/12 | (2009.01) |
| H04L 12/751 | (2013.01) |
| H04L 12/24 | (2006.01) |
| H04W 84/18 | (2009.01) |
| H04W 8/18 | (2009.01) |

(52) U.S. Cl.
CPC ............. *H04L 67/16* (2013.01); *H04L 41/12* (2013.01); *H04L 45/02* (2013.01); *H04W 8/18* (2013.01); *H04W 84/12* (2013.01); *H04W 84/18* (2013.01); *H04L 29/08072* (2013.01)

(58) Field of Classification Search
USPC .............. 709/220, 226, 217; 370/255, 401; 455/422.1; 707/E17.113
See application file for complete search history.

(56) References Cited

U.S. PATENT DOCUMENTS

| 7,656,822 B1* | 2/2010 | AbdelAziz | H04L 12/4633 370/255 |
|---|---|---|---|
| 7,831,717 B2 | 11/2010 | Palin et al. | |
| 2002/0120750 A1 | 8/2002 | Nidd | |
| 2006/0065733 A1* | 3/2006 | Lee | G06F 17/30879 235/462.01 |
| 2007/0091861 A1 | 4/2007 | Gupta et al. | |
| 2007/0299681 A1 | 12/2007 | Plastina et al. | |
| 2009/0061862 A1 | 3/2009 | Alberth, Jr. et al. | |
| 2009/0191858 A1* | 7/2009 | Calisti | H04L 12/5695 455/422.1 |
| 2009/0222530 A1* | 9/2009 | Buford | H04L 12/185 709/217 |

(Continued)

FOREIGN PATENT DOCUMENTS

| JP | 2003512770 A | 4/2003 |
|---|---|---|
| JP | 2009247000 A | 10/2009 |
| JP | 2011135325 A | 7/2011 |
| WO | WO-0130031 A1 | 4/2001 |

OTHER PUBLICATIONS

International Search Report and Written Opinion—PCT/US2013/023317—ISA/EPO—Apr. 25, 2013.

*Primary Examiner* — Kyung H Shin

(57) ABSTRACT

Apparatus and methods for automatic service discovery and connectivity include acts of or components for retrieving service metadata associated with one or more service devices from a connectivity entity, wherein the service metadata comprises connectivity parameters, and configuring one or more links with at least one of the one or more service devices based on the service metadata. Further, the apparatus and methods may include acts of or components for using a service available from the one or more service devices through the one or more links.

23 Claims, 8 Drawing Sheets

(56) References Cited

U.S. PATENT DOCUMENTS

| | | |
|---|---|---|
| 2009/0234950 A1 | 9/2009 | Wikman et al. |
| 2010/0233960 A1 | 9/2010 | Tucker et al. |
| 2010/0322213 A1* | 12/2010 | Liu .................. H04L 67/16 370/338 |
| 2011/0151840 A1 | 6/2011 | Gong et al. |
| 2011/0159818 A1 | 6/2011 | Scherzer et al. |
| 2011/0294474 A1 | 12/2011 | Barany et al. |
| 2013/0067090 A1* | 3/2013 | Batrouni ............ H04L 67/1097 709/226 |

* cited by examiner

METHOD AND APPARATUS FOR AUTOMATIC SERVICE DISCOVERY AND CONNECTIVITY

BACKGROUND

1. Field

The present disclosure relates generally to communication systems, and more particularly, to an apparatus and method for automatically discovering service and connectivity information.

2. Background

As mobile device usage continues to increase, more and more users may wish to utilize service devices that exist to provide users with services related to their mobile devices. For example, a user may wish to communicate with an electronic picture frame in the user's living room to display a photograph from his or her mobile device. Alternatively, a user may wish to communicate with a nearby projector in a classroom or convention hall to display a presentation stored on the user's mobile device. Or a user may wish to send a document stored on a mobile device to a nearby printer to print a hard copy of the document. These examples are, of course, just a few of many possible examples.

Currently, however, before such mobile services can be realized, the mobile device must be connected to the service device through a network to allow the mobile service to be discovered. For example, Bonjour, and Universal Plug and Play (UPnP) require network connectivity before the mobile device can discover the external device and its services.

Network connection establishment of this sort, however, requires that the mobile device has knowledge of connectivity parameters associated with an external device up front, before discovery. Furthermore, for wireless networks, this also requires that devices must be within range of communicative links to the network before discovery. Complicating the issue further is the existence of a multitude of link protocols, such as Bluetooth, Peanut, WiFi, and the like, all of which require unique protocol parameter data for connection.

Therefore, improvements are desired to enable use of services in an environment in which service device availability and options are increasing in quantity and complexity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Presented in the following disclosure is a method for wireless communications, which includes retrieving service metadata associated with one or more service devices from a connectivity entity, wherein the service metadata comprises connectivity parameters and configuring one or more links with at least one of the one or more service devices based on the retrieved service metadata.

Further presented in the present disclosure is a computer program product, including a computer-readable medium which includes a first set of codes for causing a computer to retrieve service metadata associated with one or more service devices from a connectivity entity, wherein the service metadata comprises connectivity parameters and a second set of codes for causing a computer to configure one or more links with at least one of the one or more service devices based on the retrieved service metadata.

The present disclosure further presents an apparatus, which includes means for retrieving service metadata associated with one or more service devices from a connectivity entity, wherein the service metadata comprises connectivity parameters and means for configuring one or more links with at least one of the one or more service devices based on the retrieved service metadata.

In additional aspects, the disclosure contemplates an apparatus that includes a retrieval component for retrieving service metadata associated with one or more service devices from a connectivity entity, wherein the service metadata comprises connectivity parameters and a configuration component for configuring one or more links with at least one of the one or more service devices based on the retrieved service metadata.

Furthermore, the present disclosure describes at least one processor configured to utilize a service, which includes a first module for retrieving service metadata associated with one or more service devices from a connectivity entity, wherein the service metadata comprises connectivity parameters and a second module for configuring one or more links with at least one of the one or more service devices based on the retrieved service metadata.

In an additional aspect, the present disclosure presents a method for providing a service from a service device, which includes broadcasting a service advertisement, receiving a request from a client device for service metadata associated with the service, providing the service metadata to the client device, and configuring a link with the client device based on the provided service metadata.

Additionally presented herein is at least one processor configured to provide a service to a client device, which includes a first module broadcasting a service advertisement, a second module for receiving a request from the client device for service metadata associated with the service, a third module for providing the service metadata to the client device, and a fourth module for configuring a link with the client device based on the provided service metadata.

In additional aspects, the present disclosure provides for a computer program product, which includes a computer-readable medium including a first set of codes for causing a computer to broadcast a service advertisement, a second set of codes for causing a computer to receive a request from a client device for service metadata associated with the service, a third set of codes for causing a computer to provide the service metadata to the client device, and a fourth set of codes for causing a computer to configure a link with the client device based on the provided service metadata.

Further presented herein is an apparatus, which may include means for broadcasting a service advertisement, means for receiving a request from a client device for service metadata associated with the service, means for providing the service metadata to the client device, and means for configuring a link with the client device based on the provided service metadata.

In further aspect, the present disclosure describes an apparatus, which includes a broadcasting component for broadcasting a service advertisement, a receiving component for receiving a request from a client device for service metadata associated with the service, a metadata providing component for providing the service metadata to the client device, and a link configuring component for configuring a link with the client device based on the provided service metadata.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
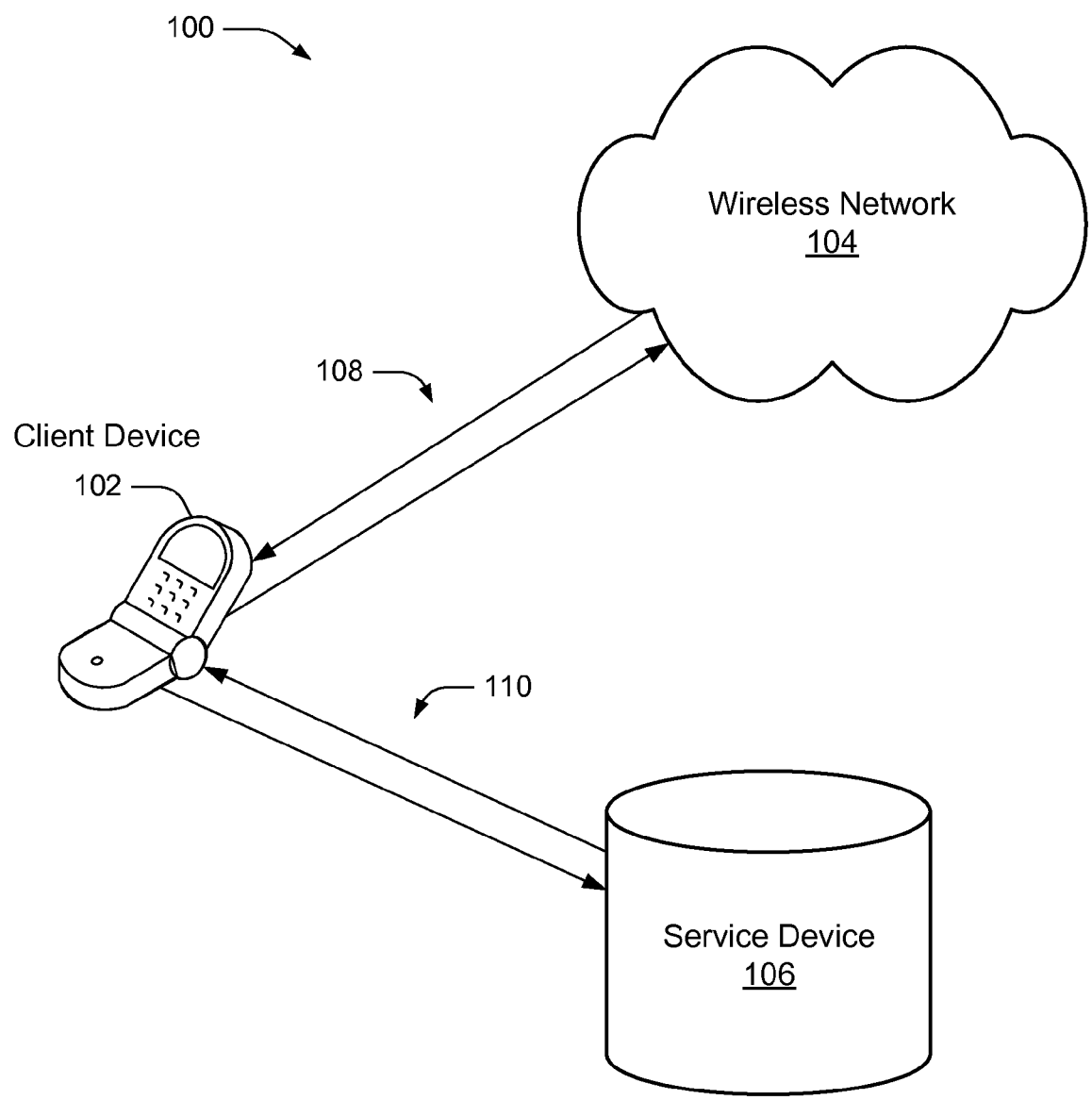
FIG. 1 is a block diagram of an example system that facilitates service discovery and connectivity.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, client device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is an example system 100 for automatic service discovery and connectivity. The system 100 may include, for example, a client device 102, such as a computer or a mobile phone or user equipment (UE), wireless network 104, and a service device 106. At any given time, client device 102 may be in communicative range of one or more service devices, such as service device 106. Service device 106 may have the ability to provide a variety of services for client device 102, including services such as, but not limited to, printing, multimedia display, data storage, or any other service capable of performance by an external device.

As a user of client device 102 may wish to utilize any of these services at a given time or location, system 100 allows for detection, connection, and utilization of service device 106 and its corresponding services regardless of interface technology. As such, system 100 allows service discovery to transcend the limitations of having connectivity a priori. Further, system 100 allows a client device 102 to use substantially ubiquitously-deployed services agnostic to network interface, technology, standard, or configuration.

In an aspect, client device 102 may detect the availability of one or more services provided by at least service device 106. For example, service device 106 may advertise service information to client device 102 in a communication 108 from wireless network 104, where communication 108 may include connectivity parameters along with the service advertisement. Using the advertised connectivity parameters, client device 102 may form a communicative connection with service device 106 and utilize service(s) associated with service device 106 via communication 110. In an aspect, the connectivity parameters allow the client device 102 to use a service associated with service device 106 despite the variety of interfaces on both client and service devices. It should be noted that communication 108 and communication 110 are illustrated as being different paths or links, however, both communications may occur along a same or similar path or link, e.g. through wireless network 104, or both communications may occur along different paths or links.

In an aspect, the connectivity parameters allow the client device 102 to utilize one or more services despite the variety of interfaces on both client and service devices. In one aspect, the connectivity parameters may include, but are not limited to, service set identifiers/base set identifiers (SSIDs/BSSIDs), such as service set identifiers for a Wireless Local Area Network (WLAN), or a pointer to a service management entity to request access to the service device, authentication requirements or information, credentials such as payment, subscription, and/or contract information, etc., wireless technology such as WiFi/Bluetooth, such as Bluetooth pairing information, etc., Session Traversal Utilities for network address translator (NAT)/traversal using relay NAT (STUN/TURN) server information for NAT traversal, uniform resource identifiers (URIs), location, etc. In another aspect, connectivity parameters may be secured, encrypted, or password protected, or the like.

Figure 2:
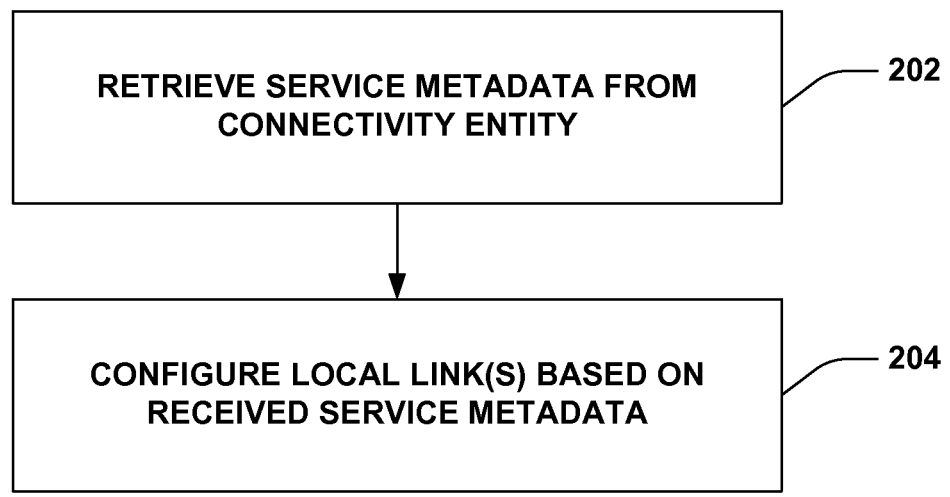
FIG. 2 is a flow chart of an aspect of an example methodology for retrieving service metadata and configuring local links based on the metadata.

Referring to FIG. 2, an example flow chart for retrieving and configuring local links between a client device, such as a UE, and a connectivity entity is shown. Through this retrieval and configuration, the client device may communicate with one or more external service devices and utilize services provided by the one or more external service devices. At block 202, the client device may retrieve metadata from a connectivity entity. In an aspect, the connectivity entity may include, but is not limited to, a cloud entity, an overlay network, a network interface, a QR code, a service device 106, etc. Next, at block 204, the local link(s) may be configured based on the metadata received from the connectivity entity.

Figure 3:
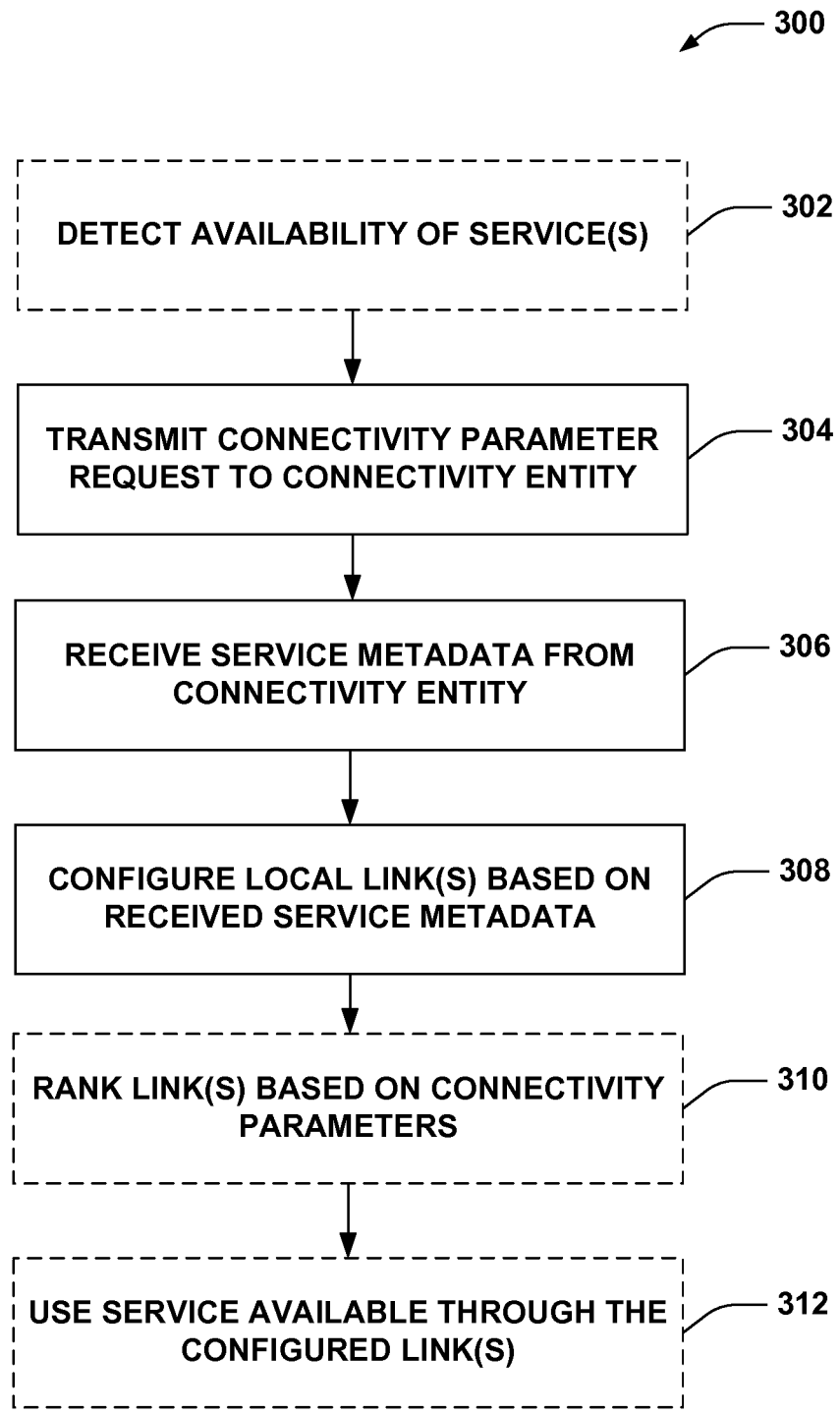
FIG. 3 is a flow chart of an aspect of an example methodology for configuring local links based on received metadata and using service(s) via the local links.

Turning to FIG. 3, illustrated is one aspect of a method 300 for retrieving connectivity parameters from a connectivity entities, configuring local link(s) based on the received service metadata, and using the services available through the configured link(s). At block 302, in one optional aspect, a client device may detect availability of one or more services provided through one or more service devices. In an example of the detection process, a service device may advertise service information. In some embodiments, the service device may advertise the type of service the service device may provide, such as, but not limited to, printing service, display services, data storage services, or the like.

Additionally, the service device may include connection parameters with the service advertisement. The connectivity parameters allow the client device to use a service despite a bevy of technologies and/or interfaces available by which a client device, service device, and/or external network may communicate. In one aspect, the connectivity parameters may include, but are not limited to, service set identifiers/base set identifiers (SSIDs/BSSIDs), authentication requirements, credentials such as payment, subscription, and/or contract information, etc., wireless technology such as WiFi/Bluetooth, etc., Session Traversal Utilities for network address translator (NAT)/traversal using relay NAT (STUN/TURN) server information for NAT traversal, uniform resource identifiers (URIs), location, etc. In another aspect, connectivity parameters may be secured, encrypted, or password protected, or the like.

In one aspect, the service advertisement can be scoped locally by including time-varying parameters, such as the location at which the service can be utilized. In another aspect, a service device may advertise a pointer to an Internet entity and/or overlay network, which may also serve as a connectivity entity that stores service information and/or connectivity parameters about one or more service devices. Thereafter, the client device may retrieve information about a particular service using an available interface and may obtain connectivity parameters corresponding to that particular service.

Alternatively, at block 304, a client device may transmit a connectivity parameter request to a connectivity entity. The client device may request connectivity parameters or metadata in order to establish a communicative connection with an external service device that may provide a service (e.g., printing, information display, etc.) for the client device. In one aspect, the connectivity parameter request may also include client device information which may include, but is not limited to, client device location information, one or more service category requests (such as, by non-limiting example, a request for the nearest printer or nearest display), one or more search terms, client device authentication information, or the like.

In some aspects, the connectivity entity from which the client device may request service information may be an electrical device that may transmit and receive tethered electrical or wireless signals from the client device. These connectivity entities may include, but are not limited to, a cloud entity (e.g. a server, etc.), base station, base station controller, router, memory or storage device located on a network, or a service device itself. Alternately, the connectivity entity may be a static network interface or pointer, such as a Quick Reference (QR) code or other device-readable static advertisement. In an additional aspect, the client device may receive a payment query, whereby the client may present payment for retrieving the service metadata.

At block 306, the client device may receive service information or metadata from the connectivity entity. In one aspect, the received service metadata may be tailored based on requested connectivity parameters—such as, but not limited to, location. By way of example, a UE may generate a location parameter corresponding to the location of the UE at a given time using a positioning system such as a Global Positioning System (GPS), or the like. By comparing location information corresponding to one or more service devices requested and received from the one or more service devices, the UE may compare its generated location parameter to the received service device locations to tailor or optimize service usage.

In an aspect, the connectivity parameters may be stored on a cloud entity and their existence advertised globally via advertisements. In an aspect, the advertisements may include the connectivity parameters. Additionally or alternatively, the connectivity parameters may be broadcast locally by a network interface or other device capable of producing a local service advertisement to a client device.

In another example, local advertisements may be accomplished without a network interface, such as by utilizing a QR code, bar code, or Universal Product Code (UPC). By way of example, a service provider may affix a QR code on the surface of a service device—such as, but not limited to, a printer, display, computer, memory, or projector—or in an area in reasonably close proximity to the service device. The QR code may include coded information, such as location, service information, connectivity parameters, and/or metadata, corresponding to the particular service device to which the QR code is affixed or to which the QR code is in reasonably close proximity. Alternatively, the QR code may utilize a pointer to coded information stored on an external device, such as a cloud device, overlay network, or server, from which the client device may receive the requested connection information or metadata.

At block 308, the client device may use the retrieved service metadata or connectivity parameters to establish connectivity and/or configure local links with the one or more service devices. In some instances, more than one link may be established with more than one service device at any given time, the individual links characterized by varying connectivity parameters or characteristics. At block 310, the client device may optionally rank the links based on connectivity parameters or characteristics. For example, the client device may rank local connectivity with a service device higher than WiFi connectivity. For instance, a client device may have established several links between the client device and printing devices—printing device 1, printing device 2, and printing device 3. The connection between the client device and printing device 1 may be a WiFi connection, the connection with printing device 2 may be a local connection, and the connection with printing device 3 may also be a WiFi connection. As a result, the client device may rank the connection with printing device 2 higher than its individual connections with printing devices 1 and 3. Therefore, the client device may utilize the services provided by printing device 2 before it utilized the services of printing devices 1 and/or 3.

Once a communicative connection is established through the local link and/or the connections are ranked, the client device may optionally use service(s) available through the configured link or links at block 312. For example, data (e.g., a PDF, word processor file, slideshow file, multimedia file, etc.) stored on the client device may be sent via the established link to a service device, such as, but not limited to, a printer, device, or data storage device. Once received at the service device, the service device may provide a service, for example, by utilizing the sent data to print, display, or store a data file.

Figure 4:
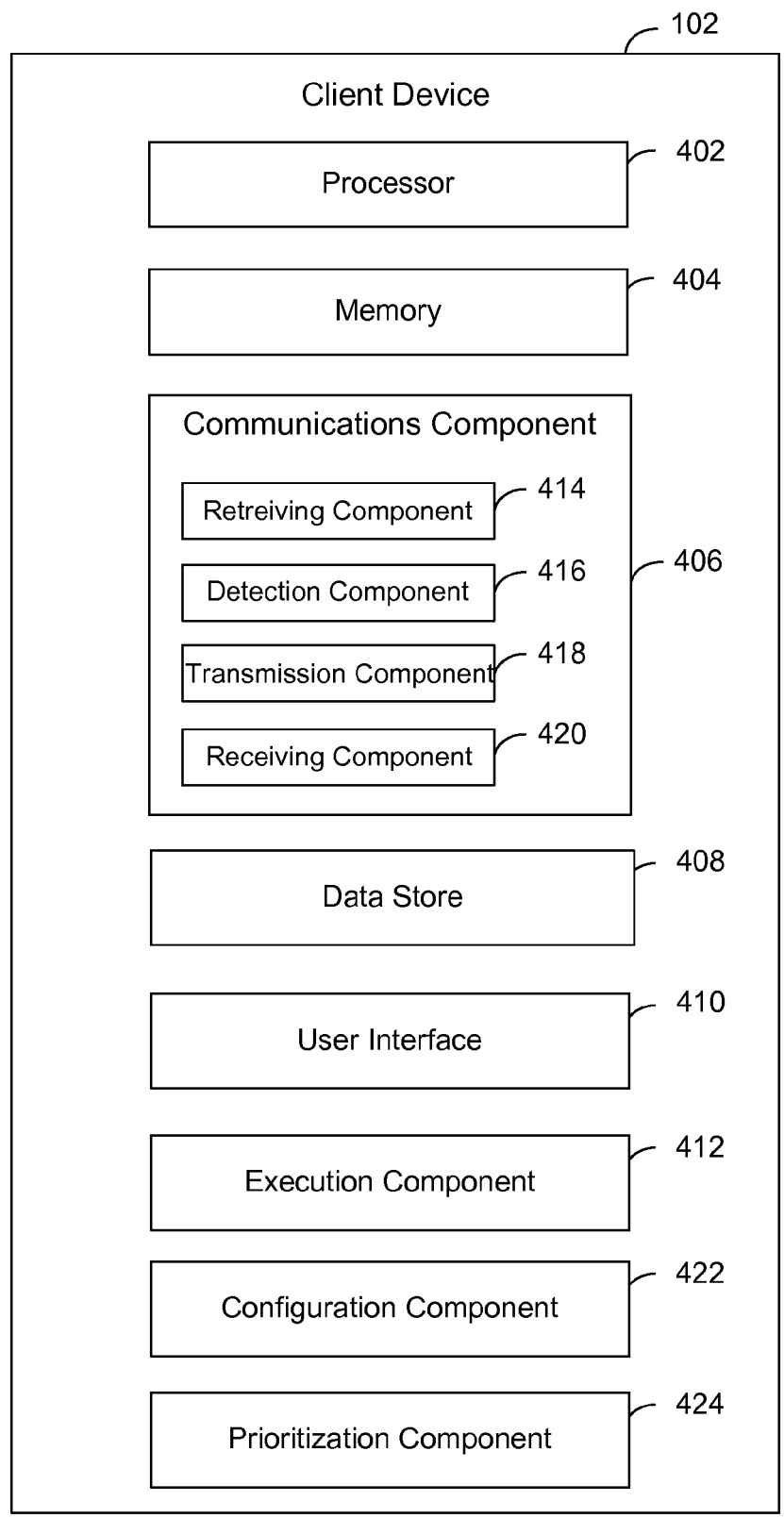
FIG. 4 is a block diagram of an example client device for service discovery and connectivity.

Referring to FIG. 4, client device 102 includes one or more components for carrying out the functions described herein. In an aspect, client device 102 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system.

Processor 402 may include components or modules that may implement the aspects of the present invention, including but not limited to the aspects illustrated in FIG. 3. For example, these components or modules may retrieve service data corresponding to one or more service devices, which may include requesting the service data and receiving the service data from a connectivity entity. In addition, these components or modules may configure one or more links with one or more service devices, and may rank these established links based on one or more characteristics of the link or links. Furthermore, the components or modules may detect availability of one or more service devices based on a service advertisement from the one or more service devices. Additionally, the components or modules may be configured to allow a client device to use a service associated with a service device.

Client device 102 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, client device 102 includes a communications component 406 that provides for establishing and maintaining communications with one or more parties utilizing hardware, software, and services as described herein. Communications component 406 may carry communications between components on client device 102, as well as between client device 102 and external devices, such as devices located across a communications network and/or devices serially or locally connected to client device 102. For example, communications component 406 may include one or more buses, and may further include transmit chain components and receive chain components associated with a transmitter and receiver, respectively, operable for interfacing with external devices.

Communications component 406 may also include or be coupled to a detection component 416 for detecting the availability of one or more service devices based on a service advertisement by one or more service devices. Detection component 416, may, for example, detect an electromagnetic signal broadcast by a service device that advertises available services. Additionally, the electromagnetic signal may contain metadata or connectivity parameters related to the service device. Detection component 416 may coordinate with, for example, reception component 420 to parse, store, or otherwise utilize this metadata embedded in a service advertisement signal.

Additionally, detection component 416 may include a photo camera, motion picture camera, or other optical device and corresponding firmware, software, or control instructions to capture and analyze a QR code affixed to or in the vicinity of a particular service device. Furthermore, the detection component 416 may contain processing capability that allows detection component 416 to decode the QR code for storage or immediate use by other components in the client device, such as processor 402 and/or communications component 406. Alternatively or additionally, detection component 416 may include a bar code reader, such as a UPC reader, that may include a laser reader, in the case of a static service device advertisement in the form of a bar code or UPC code.

Furthermore, communications component 406 may optionally contain or may be coupled to a retrieval component 414 for retrieving service metadata or connection information from a connectivity entity based on connectivity parameters.

Additionally or alternatively, communications component 406 may contain or may be coupled to a transmission component 418 and/or a reception component 420. Transmission component 418 may transmit a connectivity parameter request to a connectivity entity in an attempt to ascertain connectivity information regarding a particular service device. Correspondingly, receiving component may receive service metadata from a connectivity entity in response to the request sent by transmission component 418.

Additionally, client device 102 may further include a data store 408, which can be any suitable combination of hardware and/or software, that provides for mass storage of information, databases, and programs employed in connection with aspects described herein. For example, data store 408 may be a data repository for applications not currently being executed by processor 402.

Client device 102 may additionally include a user interface component 410 operable to receive inputs from a user of client device 102, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output or service to a user or client device, or any combination thereof.

Furthermore, client device 102 may include an execution component 412, which may assist in enabling services from service device 106 on client device 102. For example, execution component 412 may include instructions for communications component 406 to send service device 106 instructions to perform a particular service, thereby allowing client device 102 to use service(s) provided by service device 106. In an aspect, for example, execution component 412 may instruct service device 106 to print a picture file sent to the service device 106 by client device 102, in the case where service device 106 is a printer. Alternatively, in one example, execution component 412 may contain instructions to cause the service device 106 to store a file sent by a client device 102.

Additionally, in some aspects, client device 102 may include configuration component 422 for configuring one or more links with at least one or the one or more service devices based on service information or metadata. Configuration component 422 may communicate with, give instructions to, coordinate with, or take instructions from any of the other components of computer device, such as processor 402 and communications component 406, for example. Additionally, configuration component 422 may communicate with one or more service devices via communications component 406 to coordinate and configure the one or more communicative links between a client device and one or more service devices.

Additionally, in some aspects, client device 102 may include prioritization component 424 for prioritizing or ranking the one or more links based on the connectivity parameters associated with each of the one or more links. For example, in an aspect, client device 102 may establish more than one link with at least one service device 106, and may rank these links based on, for example, connectivity parameters, and/or link characteristics associated with each of the more than one links. In an aspect, a first link established with a first service device may have associated connectivity parameters that are better suited to the particular client device than connectivity parameters of a second link associated with a second service device. In this case, the client device 102 may prioritize or rand the one or more links based on their respective connectivity parameters in prioritization component 424.

Figure 5:
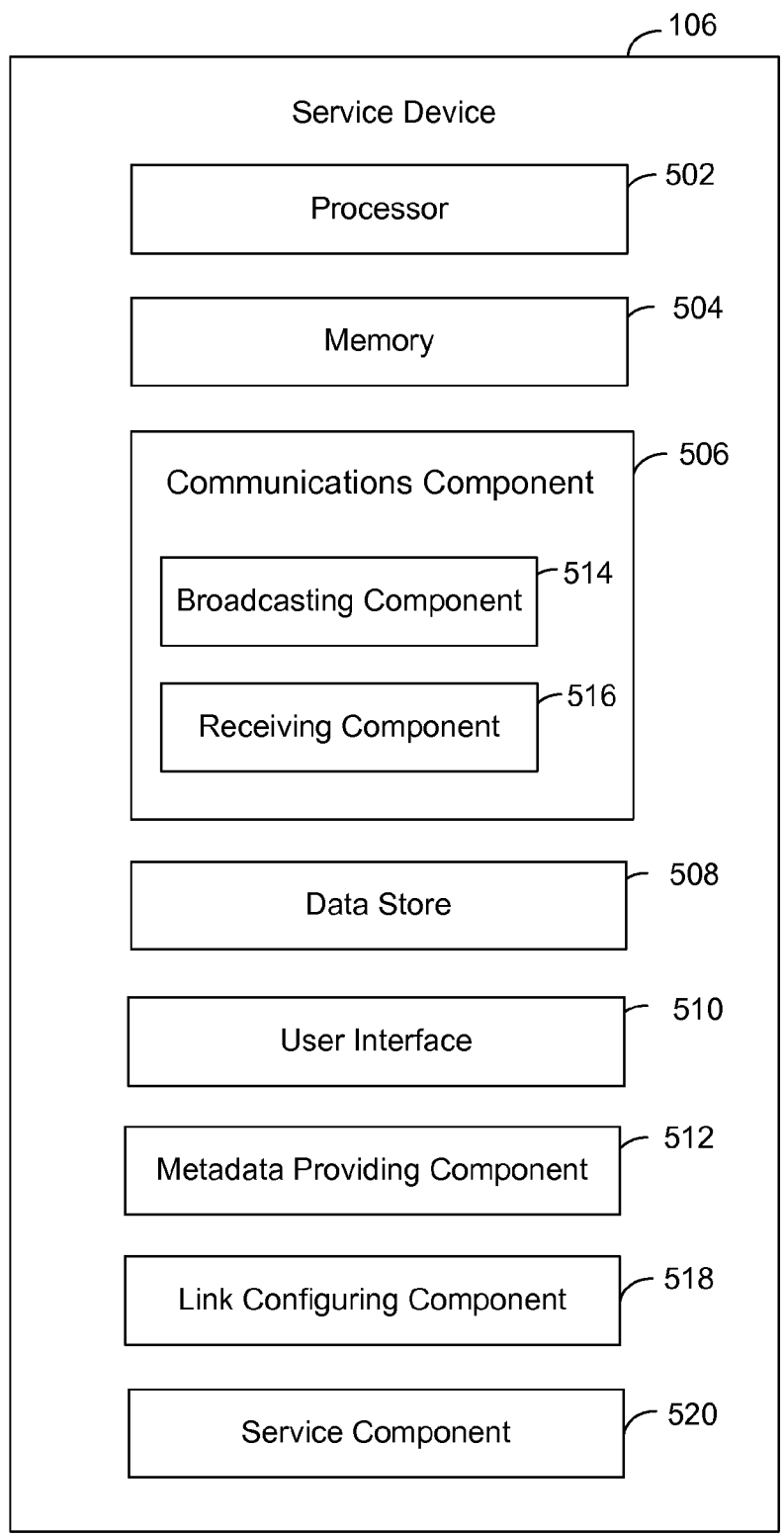
FIG. 5 is a block diagram of an example service device for providing one or more services to a client device.

Turning to FIG. 5, service device 106 includes one or more components for carrying out the functions described herein. In an aspect, service device 106 may include a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Service device 106 further includes a memory 504, such as for storing data used herein and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, service device 106 includes a communications component 506 that provides for establishing and maintaining communications with one or more parties utilizing hardware, software, and services as described herein. Communications component 506 may carry communications between components on service device 106, as well as between service device 106 and external devices, such as devices located across a communications network and/or devices serially or locally connected to service device 106. In addition, communications component 506 may include a broadcasting component 514, which may broadcast an electromagnetic advertisement signal to indicate to other devices (e.g., client devices 102) that a particular service associated with a service device is available. Additionally, included within the advertisement signal may be metadata and/or connectivity data for the client device(s) to utilize in connecting with the service device. In an additional aspect, broadcasting component may include a transmitter, transceiver, and/or control circuitry for performing the functions of a transmitter and/or transceiver. Additionally, communications component 506 may include a receiving component 516, which may be configured to receive a request for service metadata and/or connectivity parameters from a client device 102. In an aspect, receiving component 516 may include a receiver, transceiver, and/or control circuitry for performing the functions of a receiver and/or transceiver. In an additional aspect, communications component 506 may include one or more buses, and may further include transmit chain components and receive chain components associated with a transmitter and receiver, respectively, operable for interfacing with external devices.

Additionally, data store 508 may store data related to providing service(s) to client device(s). Such data may include, but is not limited to, connectivity information, service information, metadata, pointers to externally-stored connectivity or service information, communications software, service implementation application software, or the like.

Furthermore, service device 106 may include a metadata providing component 512 for providing metadata to one or more client devices 102. In an aspect, metadata providing component may store service metadata and/or connectivity parameters associated with connecting with service device 106. In an additional aspect, metadata providing component may provide a pointer to a connectivity entity to the requesting client device 102, which may itself contain the requested service metadata and/or connectivity parameters. In addition, service device 106 may include a link configuring component 518, which may request, set up, and/or configure one or more links with one or more client devices 102. In an aspect, metadata providing component 512 and/or link configuring component 518 may be connected to communications component 506 and/or broadcasting component 514 and receiving component 516, which may transmit or receive signals to and from the client device 102.

Furthermore, service device 106 may include a service component 520 for providing one or more services to a client device 102. For example, service component 520 may include instructions executable by processor 502 to cause the service device to print a picture file sent to the service device 106 by client device 102, in the case where service device 106 is a printer. Alternatively, in one example, service component 520 may contain instructions to cause memory 504 to store a file sent by a client device 102. Furthermore, in an aspect, service component 520 may contain a media player to play and/or display one or more files from the client device 102, such as, but not limited to, a slideshow presentation, video file, sound file, and/or a picture file. These recited examples are non-limiting, as service device 106 may provide any service provided by electronic devices on a communications network or in a wireless communication system.

Figure 6:
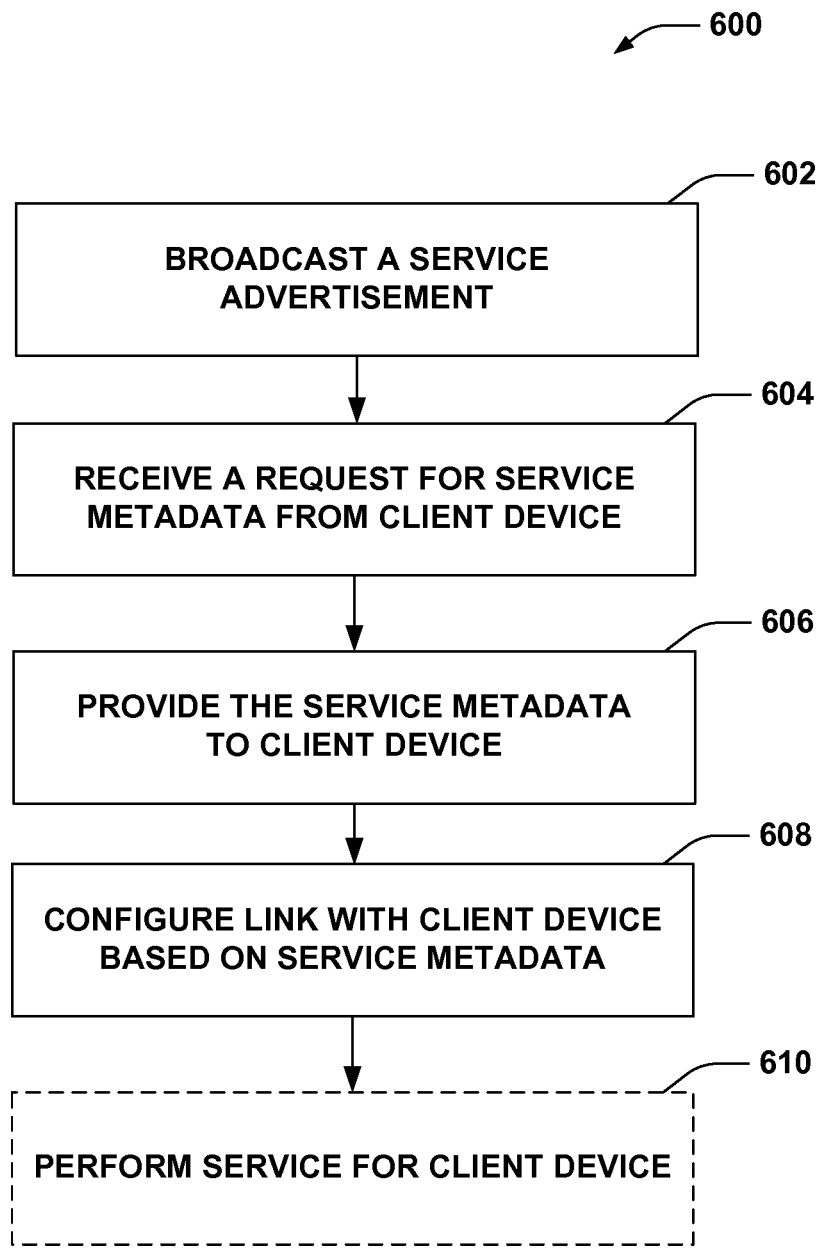
FIG. 6 is a flow chart of an aspect of an example methodology for providing service metadata to one or more client devices.

FIG. 6 depicts aspects of a method 600 for providing one or more services to one or more client devices 102, such as by a service device 106 (FIG. 1). In an aspect, the service device may operate in a wireless communications network, environment, or system (e.g. 100, FIG. 1). At block 602, the service device 106 may broadcast a service advertisement to one or more client devices in a wireless system 100. This service advertisement may include information regarding the types of services the service device is able to perform for the one or more client devices 102. Additionally, the service advertisement may include information pertaining to connectivity parameters, such as service metadata.

In an additional aspect, at block 604, the service device 106 may receive a request for service metadata from client device 102, which may seek to utilize the services advertised by the service device 106. In response to this request, the service device may provide the requested service metadata to the requesting client device 102 at block 606. The service device 106 may also require the client device 102 and/or its user to present payment information before providing the service metadata to the client device 102 at block 606. Alternatively or additionally, the service device 106 may provide the client device 102 a pointer to a separate connectivity entity, which may contain the requested service metadata and/or connectivity parameters.

Furthermore, at block 608, the service device 106 may configure a link with the client device 102 based on the service metadata that was provided to the client device 102. In an aspect, service device 106 or client device 102 may initiate the link configuration, for example, by sending a connectivity request to the corresponding device. In an additional aspect, once the link between the client device 102 and service device 106 is configured and established, at block 610, the service device 106 may perform a service to the client device 102.

Figure 7:
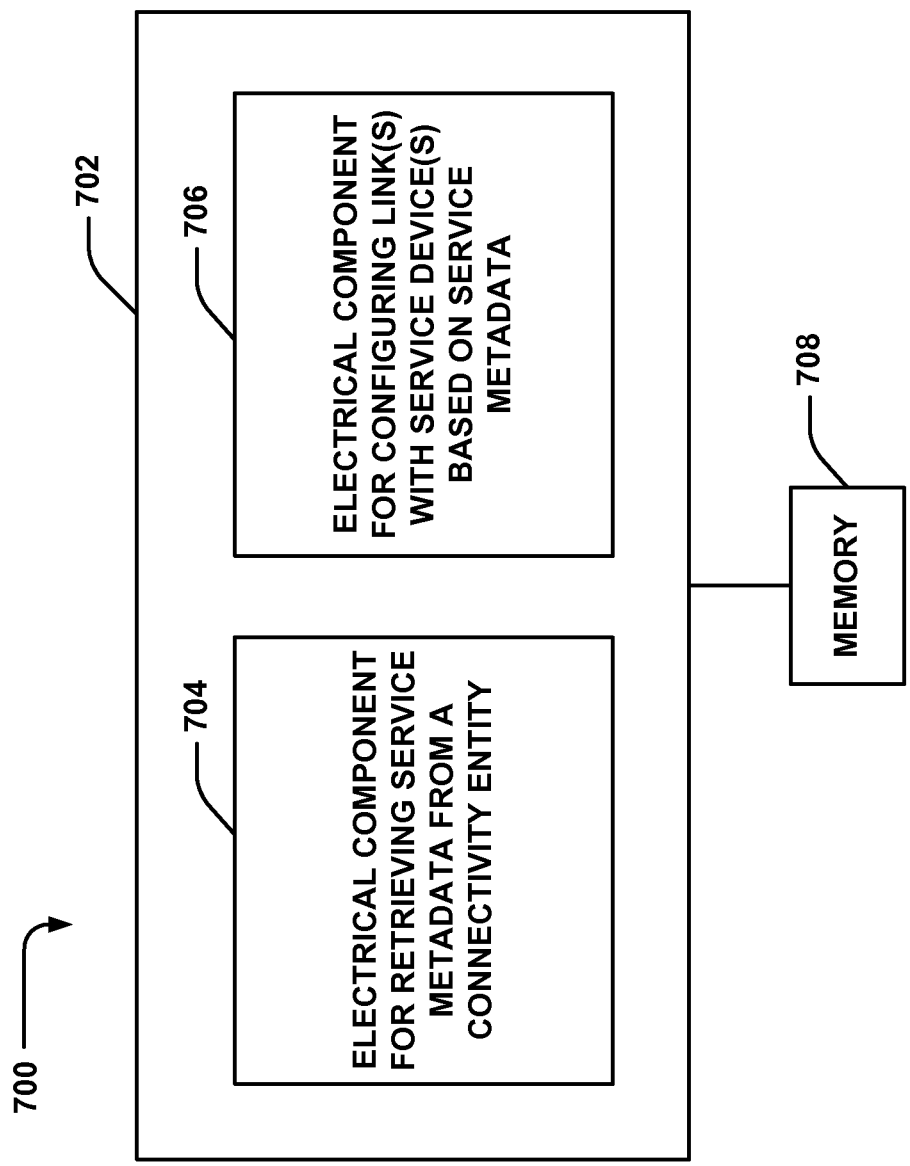
FIG. 7 is an electrical component diagram of an example apparatus for retrieving service metadata and configuring links based on the metadata.

Referring to FIG. 7, an example system 700 is displayed for providing services to a mobile device user. For example, system 700 can reside at least partially within a device. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component 704 for retrieving service metadata associated with one or more service devices from a connectivity entity based on connectivity parameters. In such an aspect, the electrical component 704 may further be configured for transmitting a connectivity parameter request to the connectivity entity, and receiving the service metadata in response to the connectivity parameter request.

Moreover, logical grouping 702 can include an electrical component 706 for configuring one or more links with at least one of the one or more service devices based on the retrieved service metadata. This can be based on receiving the authorization and/or parameters received in the authorization message, as described. In one aspect, logical grouping 702 may include an electrical component for detecting availability of the one or more service devices based on a service advertisement by at least one of the one or more service devices. In such an aspect, the service advertisement may include connectivity parameters for the service device, a pointer to the connectivity entity that stores the connectivity parameters and associated service metadata for the service device, etc. Further, the connectivity parameters may include a location component, a time-varying parameter. In another aspect, logical grouping 702 can include an electrical component for using a service available through the one or more configured links. In one aspect, the service metadata may be stored in a cloud entity. In another aspect, logical grouping 702 can include an electrical component for ranking the one or more links based on the connectivity parameters associated with each of the one or more links. For example, the electrical component for ranking the links may include, but is not limited to, prioritization component 424 of FIG. 4. In still another aspect, logical grouping 702 can include an electrical component for receiving a service advertisement from one of the one or more service devices made available without a network interface. For example, the electrical component for ranking the links may include, but is not limited to, receiving component 414 of FIG. 4. In one aspect, the connectivity parameters may be secured.

Additionally, system 700 can include a memory 708 that retains instructions for executing functions associated with the electrical components 704 and 706, stores data used or obtained by the electrical components 704 and 706, etc. While shown as being external to memory 708, it is to be understood that one or more of the electrical components 704 and 706 can exist within memory 708. In one example, electrical components 704 and 706 can comprise at least one processor, or each electrical component 704 and 706 can be a corresponding module of at least one processor. Moreover, in an additional or alternative example, electrical components 704 and 706 can be a computer program product including a computer readable medium, where each electrical component 704 and 706 can be corresponding code.

Figure 8:
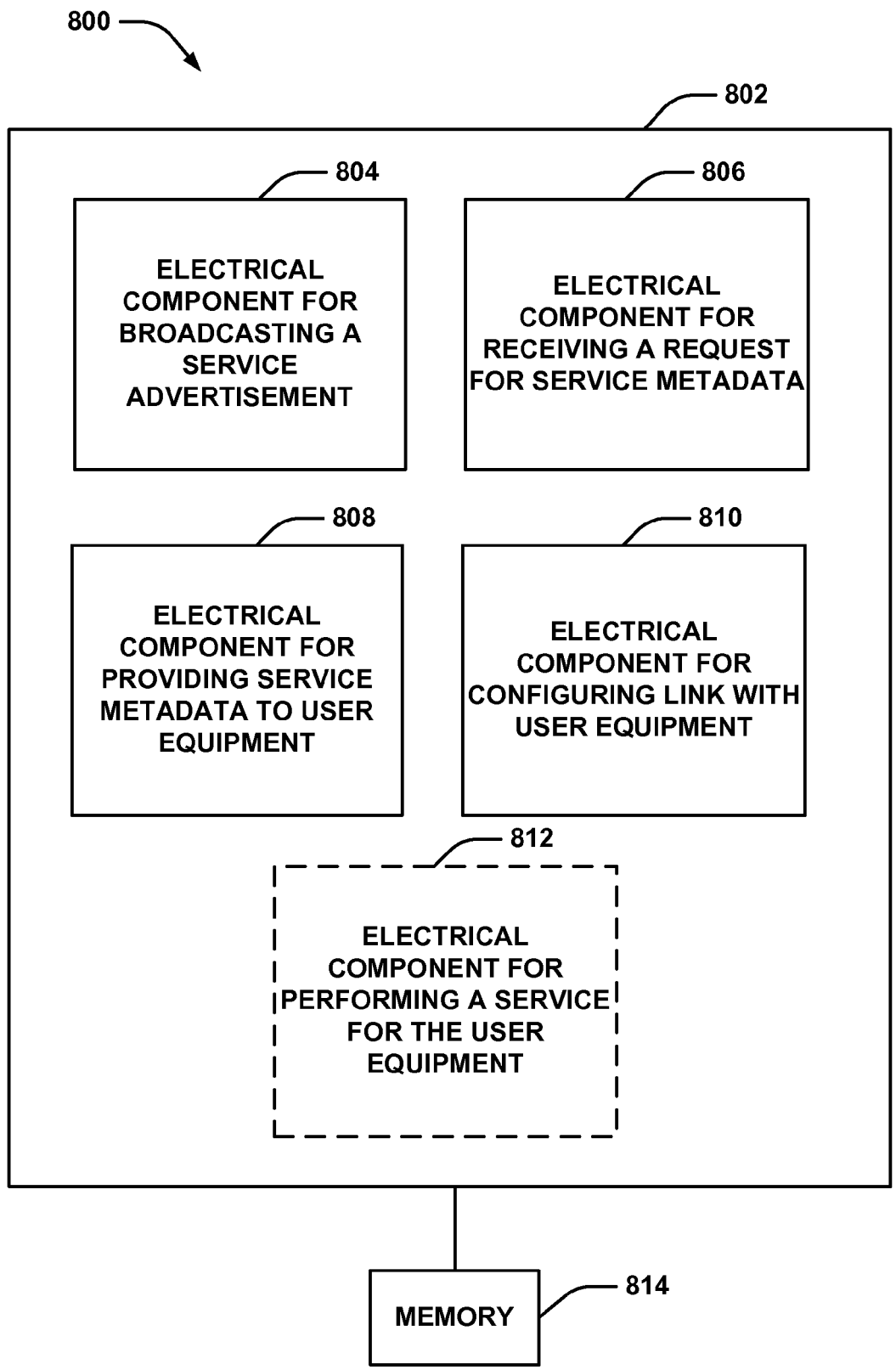
FIG. 8 is an electrical component diagram for an example apparatus for providing service metadata to one or more client devices.

Referring to FIG. 8, an example system 800 is displayed for providing services to one or more client devices. For example, system 800 can reside at least partially within a device. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component 804 for broadcasting a service advertisement to one or more client devices 102 (FIGS. 1, 5). In such an aspect, the service advertisement may include connectivity parameters for the service device, a pointer to the connectivity entity that stores the connectivity parameters and associated service metadata for the service device, etc.

Additionally, logical grouping 802 can include an electrical component 806 for receiving a request for service metadata. In an additional aspect, logical grouping 802 may include an electrical component 808 for providing service metadata to one or more client devices 102. Further, electrical component 808 may provide a pointer to a connectivity entity, which may itself contain requested metadata and/or connectivity parameters. In a further aspect, the service metadata may be stored in a cloud entity. In another aspect, logical grouping 802 can include an electrical component 810 for configuring one or more links with one or more client devices 102 Furthermore, in some aspects, logical grouping 802 can include an electrical component 812 for performing one or more services for one or more client devices Additionally, system 800 can include a memory 814 that retains instructions for executing functions associated with the electrical components 804, 806, 808, 810, and/or 812, stores data used or obtained by the electrical components 804, 806, 808, 810, and/or 812, etc. While shown as being external to memory 814, it is to be understood that one or more of the electrical components 804, 806, 808, 810, and/or 812 can exist within memory 814. In one example, electrical components 804, 806, 808, 810, and/or 812 can comprise at least one processor, or each electrical component 804, 806, 808, 810, and/or 812 can be a corresponding module of at least one processor. Moreover, in an additional or alternative example, electrical components 804, 806, 808, 810, and/or 812 can be a computer program product including a computer readable medium, where each electrical component 804, 806, 808, 810, and/or 812 can be corresponding code.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communications, comprising:
retrieving, by a user equipment (UE), service metadata associated with one or more service devices from a connectivity entity, wherein the service metadata comprises connectivity parameters including a service set identifier corresponding to a network over which to request access to each of the one or more service devices;
configuring, by the UE, one or more links with at least one of the one or more service devices over the network based on the service metadata; and
using a service of the at least one of the one or more service devices over the one or more links,
wherein the connectivity parameters include a location of the one or more service devices, and wherein configuring the one or more links with at least one of the one or more service devices comprises selecting the at least one of the one or more service devices based at least in part on comparing the location of the one or more service devices with a determined location of the UE.

2. The method of claim 1, further comprising:
   detecting availability of the one or more service devices based on a service advertisement by at least one of the one or more service devices.

3. The method of claim 2, wherein the service advertisement includes at least one of:
   the connectivity parameters for the one or more service devices, or
   a pointer to the connectivity entity that stores the connectivity parameters and associated service metadata for the one or more service devices.

4. The method of claim 3, wherein the connectivity parameters comprise at least one of a location component, a time-varying parameter, a Wireless Local Area Network (WLAN) Service Set Identifier (SSID), authentication information, Bluetooth pairing information, or a pointer to a service management entity to request access to the one or more service devices.

5. The method of claim 1, wherein the retrieving comprises:
   transmitting a connectivity parameter request to the connectivity entity; and
   receiving the service metadata in response to the connectivity parameter request.

6. The method of claim 1, wherein the service metadata is stored in a cloud entity.

7. The method of claim 1, further comprising:
   ranking the one or more links based on the connectivity parameters associated with each of the one or more links.

8. The method of claim 1, further comprising:
   detecting availability of the one or more service devices based on a service advertisement made available without a network interface.

9. The method of claim 1, wherein the connectivity parameters are secured.

10. The method of claim 1, further comprising receiving a payment query for retrieving the service metadata.

11. A non-transitory computer-readable medium comprising computer-executable code for wireless communications, the code comprising:
   code for retrieving, by a user equipment (UE), service metadata associated with one or more service devices from a connectivity entity, wherein the service metadata comprises connectivity parameters including a service set identifier corresponding to a network over which to request access to each of the one or more service devices;
   code for configuring one or more links with at least one of the one or more service devices over the network based on the service metadata; and
   code for using a service of the at least one of the one or more service devices over the one or more links,
   wherein the connectivity parameters include a location of the one or more service devices, and wherein the code for configuring configures the one or more links with at least one of the one or more service devices based at least on selecting the at least one of the one or more service devices based at least in part on comparing the location of the one or more service devices with a determined location of the UE.

12. The non-transitory computer-readable medium of claim 11, further comprising:
   code for detecting an availability of the one or more service devices based on a service advertisement by at least one of the one or more service devices.

13. The non-transitory computer-readable medium of claim 11, further comprising:
   code for transmitting a connectivity parameter request to the connectivity entity; and
   code for receiving the service metadata in response to the connectivity parameter request.

14. An apparatus, comprising:
   at least one processor configured to execute:
      a retrieval component configured to retrieve, via a receiver operable for interfacing with external devices, service metadata associated with one or more service devices from a connectivity entity, wherein the service metadata comprises connectivity parameters including a service set identifier corresponding to a network over which to request access to each of the one or more service devices; and
      a configuration component configured to configure one or more links with at least one of the one or more service devices over the network based on the service metadata; and
      a communications component configured to use a service of the at least one of the one or more service devices over the one or more links,
   wherein the connectivity parameters include a location of the one or more service devices, and wherein the configuration component is further configured to select the at least one of the one or more service devices based at least in part on comparing the location of the one or more service devices with a determined location of the apparatus.

15. The apparatus of claim 14, wherein the at least one processor is further configured to execute:
   a detection component configured to detect an availability of the one or more service devices based on a service advertisement by at least one of the one or more service devices.

16. The apparatus of claim 15, wherein the service advertisement includes at least one of:
   the connectivity parameters for the one or more service devices, or
   a pointer to the connectivity entity that stores the connectivity parameters and associated service metadata for the one or more service devices.

17. The apparatus of claim 16, wherein the connectivity parameters comprise at least one of a location component, a time-varying parameter, a Wireless Local Area Network (WLAN) Service Set Identifier (SSID), authentication information, Bluetooth pairing information, or a pointer to a service management entity to request access to the one or more service devices.

18. The apparatus of claim 15, wherein the detection component is further configured to detect the availability of the one or more service devices based on a service advertisement made available without a network interface.

19. The apparatus of claim 14, wherein the at least one processor is further configured to execute:
   a transmission component for transmitting a connectivity parameter request to the connectivity entity; and
   a receiving component for receiving the service metadata in response to the connectivity parameter request.

20. The apparatus of claim 14, wherein the service metadata is stored in a cloud entity.

21. The apparatus of claim 14, wherein the at least one processor is further configured to execute:
   a prioritizing component configured to rank the one or more links based on the connectivity parameters associated with each of the one or more links.

22. The apparatus of claim 14, wherein the connectivity parameters are secured.

23. The apparatus of claim 14, wherein the at least one processor is further configured to execute the receiver configured to receive a payment query for retrieving the service metadata.

* * * * *